3,391,475
EDUCATIONAL DEVICE FOR DEMONSTRATING THE PRINCIPLE OF A STEAM REACTION TURBINE
Hyman Ruchlis and Harry Spector, Brooklyn, N.Y., assignors to Harcourt, Brace & World, Inc., New York, N.Y., a corporation of New York
Filed Oct. 15, 1965, Ser. No. 496,595
7 Claims. (Cl. 35—19)

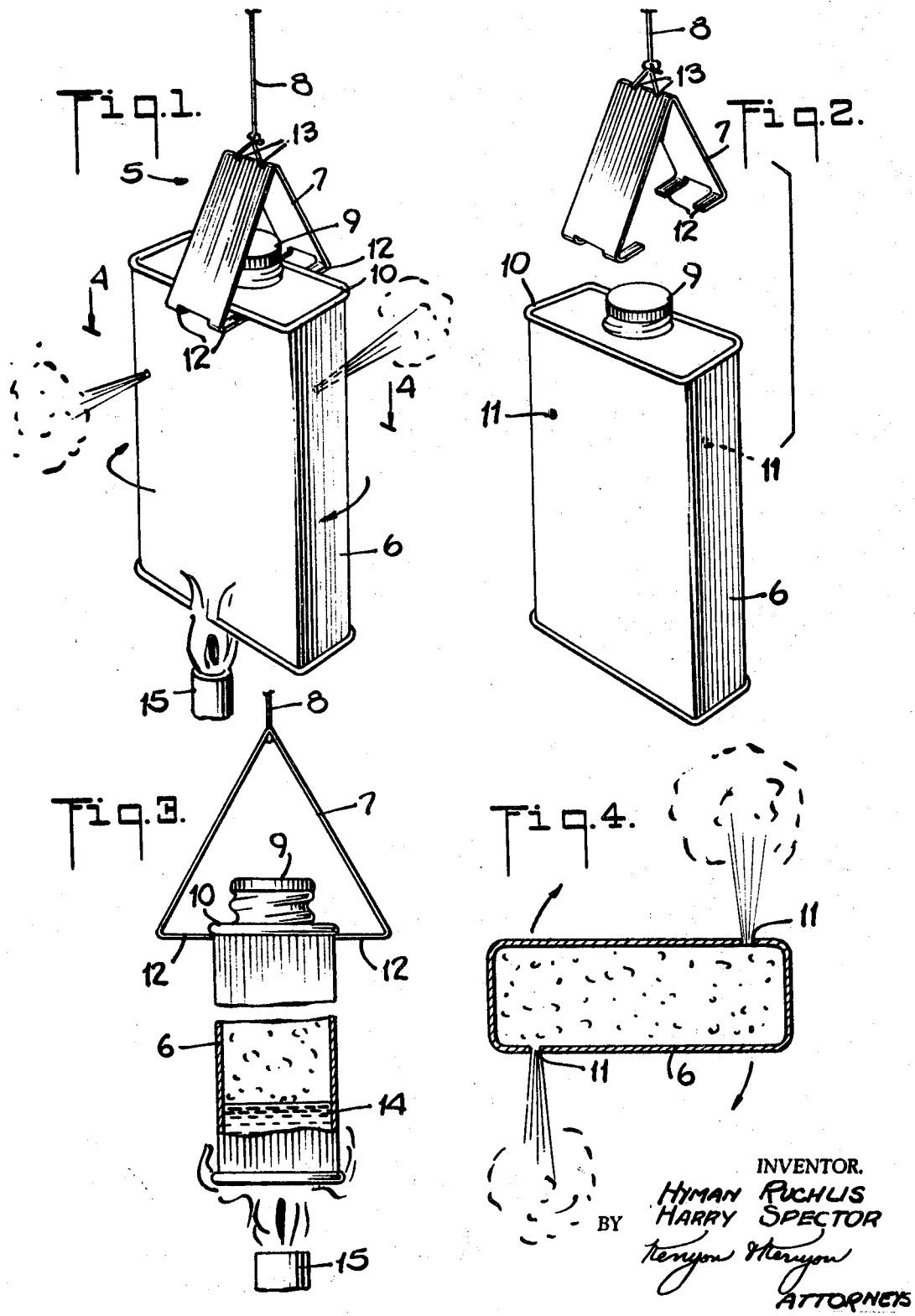

ABSTRACT OF THE DISCLOSURE

The rectangular shaped container is provided with a pair of holes which are laterally displaced from each other about the axis of the container. The container is suspended on its axis by a biased yoke and string arrangement so that steam issuing from the holes causes the container to rotate.

This invention relates to an educational device. More particularly, this invention relates to an educational device for demonstrating the principle of operation of a steam reaction turbine.

In the field of applied science projects of science education it is desirable to provide teaching devices and visual aids which are particularly adapted for limited classroom space and designed for either wall hanging or table mounted lecture presentation. These devices and apparatus must be capable of stimulating a student's interest, intensifying the student's retention of the physical principle being verified in the demonstration and motivating the student by personal involvement. Among the problems of achieving these ends is the problem of producing a production model at low cost, as well as the problem of providing an easily understandable model.

Heretofore, in order to demonstrate the principle of operation of a steam reaction turbine, a form of Hero's engine has been utilized. The usual demonstration model has been a modification of the classic Hero's engine in that it has consisted of a hollow metal sphere mounted for rotation on a rigid pivot support and a heat source below the metal sphere. The sphere is further provided with a pair of oppositely mounted nozzles which are each bent at right angles to the surface of the spheres. In operation, the metal sphere is filled with an amount of water and the water is heated to steam by the heat source. The steam then issues from each of the bent nozzles causing a reaction couple which causes the metal sphere to revolve about the pivot support axis.

Because a sphere is used in demonstrating the principle, it is essential that the nozzles be bent at right angles to the sphere so as to change the direction of motion of the steam jets. Otherwise, the steam would issue in line with the center of the sphere and would be unable to cause rotation of the sphere.

One of the major educational limitations in the usual demonstration model of the Hero's engine arises out of the fact that the curvature of the container obscures the main didactic point. Specifically, the radial symmetry of the sphere fails to suggest the axis of rotation. Of course, once one understands the principle being demonstrated, then it is clear that the axis of rotation is the vertical diameter of the suspended sphere. However, in a teaching situation, the assumption must not be made that the person being taught already understands what it is intended to teach him.

In spite of the simplicity of the heretofore used demonstration model of this engine, working production models are generally not available for educational purposes to educational institutions. This is due to the relatively high cost of producing working models having a spherical shape and of attaching bent nozzles to such models. In addition, the pivot mounting for the sphere is expensive since it must be constructed so as not to be interfered with or otherwise affected by the heat source.

Accordingly, it is an object of this invention to provide an educational device for demonstrating the principle of operation of a steam reaction turbine.

It is another device of this invention to provide an educational device for demonstrating the principle of operation of a steam reaction turbine which is inexpensive to manufacture and simple to use.

It is another object of this invention to provide an educational device for demonstrating the principle of operation of a steam reaction turbine which is easily stored.

It is another object of this invention to provide an educational device which is easily understood.

It is another object of this invention to provide a pivot support for a simplified educational device for demonstrating the principle of operation of a steam reaction turbine which does not interfere with the heating source therefor.

This invention provides an educational device for demonstrating the principle of operation of a steam reaction turbine which is comprised of a rectangularly shaped container, and a suspending means having a yoke means for gripping the top portion of the container, and a thread means secured to the yoke means for supporting the device in depending fashion. The container is provided with a pair of holes, each hole being formed in an oppositely disposed broad side of the container in asymmetric relation to the other and each being located in an upper corner of the respective side of the container.

The yoke means is provided with a pair of closely spaced central apertures at its apex which permit the thread to be passed therethrough for attaching the yoke means to a suitable support.

In order to utilize the structure of the invention in an educational demonstration, the container is partially filled with water and the yoke means is slipped over the container and centered. The thread which is passed through the central apertures in the yoke means is then attached to a suitable support to allow the yoke means and container to be supported in depending fashion with the axis of the thread being coaxial with the axis of the container. A small heating source is then brought into position beneath the container to heat the water therein to steam. As the steam issues from the asymmetrical holes in the sides of the container, a force couple is produced which causes the container to revolve about the axis formed by the thread.

Because of the thread mounting of the container and yoke from above, there is very little friction to overcome and the container thus responds instantly to the issuance of a steam jet. In addition, the simplified mounting from above insures a physical separation between the heat source and the thread so as to avoid any damage to the thread or any interference therebetween. Consequently, the device is relatively indestructible under normal use as there are no mechanical bearing problems nor any adverse effects on the component parts of the device by the heat source.

The device of the invention is readily adaptable for educational purposes since it can be produced from a few relatively simple components at a relatively low cost and can be used repeatedly. Hence, it is an especially desirable device for those educational institutions which have limited budgets. The device not only is extremely simple to use in a demonstration but also clearly demonstrates the principle of operation of a steam reaction turbine.

Thus, the device can be readily understood by the students participating in a demonstration.

These and other objects and advantages of the invention will become more apparent from the following detailed description and appended claims taken in conjunction with the accompanying drawings in which:

FIG. 1 illustrates a device of the invention in operation;

FIG. 2 illustrates an exploded view of the device of FIG. 1;

FIG. 3 illustrates a side view of the device of the invention with a partial cut-away section; and FIG. 4 illustraates a view taken at line 4—4 of FIG. 1.

Referring to the drawings, the educational device 5 of the invention is composed of a rectangular shaped container 6, a V-shaped yoke 7 and a thread 8.

The container 6 is made of any suitable material which is flame resistant and heat conductive, for example, the container can be of the usual tinned metal type having a pair of oppositely disposed broad sides. The container 6 is provided with a suitable filling port in the top surface which is removably sealed by a suitable means 9, such as, an internally threaded cap. The container is also provided with a circumferential lip 10 around the upper edge thereof for cooperation with the yoke 7. A pair of holes 11 are provided in the container, each hole being in an oppositely disposed broad side of the container 6 in asymmetric relation to the other hole.

The yoke 7 is made of any suitable material similar to the material of the container 6 and is provided with pairs of oppositely disposed gripping fingers 12 inwardly disposed at the free ends. The yoke 7 is suitably spring biased so that the opposed fingers are urged towards each other after an initial displacement of the free ends from their free position.

Thus, when the yoke 7 is slipped over the container 6, the free ends are initially displaced and the fingers 12 grip the container 6 with the force created by the spring bias. The securement of the yoke 7 on the container 6 is assured by abutment of the fingers 12 against the lip 10 so as to prevent the fingers 12 from being separated in an axial direction from the sides of the container 6.

The yoke 7 is also provided with a pair of centrally disposed apertures 13 at the apex thereof through which the thread 8 passes. The apertures 13 are arranged so that when the thread 8 is suitably tied, the axis of the thread 8 is coaxial with the axis of the yoke 7 as well as the axis of the container 6.

In operation, the container 6 is filled with a suitable fluid 14, such as, water, through the filling port to a suitable height and the cap 9 is then secured thereon. The yoke 7 is slipped sideways over the container 6 so that the fingers 12 abut the lip 11 and then centralized. The thread 8 which may be secured to the yoke 7 before or after the slipping of the yoke onto the container is secured to a suitable support (not shown) so that the container depends therefrom. This type of support permits the thread 8 to act as a pivot axis for the device 5. A suitable heat source 15 is then brought under the base of the container 6 to heat the water therein to steam. As the steam escapes through the respective holes 11 a reaction force is created at each hole. The reaction forces combine to act as a force couple to rotate the device 5 around the axis of the thread 8 in a direction as shown by the arrows in FIG. 4. The rotation of the device 5 will continue with a corresponding gradual twisting of the thread until the twisted thread creates a force in opposition to the force couple of the steam. Thus, this self-regulating function of the thread will stop the device 5 from rotating well before the water is completely heated to steam. Thus, the device of this invention, being rectangular in shape, and being used in a recognizable form and attitude (that is a container with a top cap which is suspended vertically) has a main vertical axis Z—Z which is immediately suggested to the viewer. It is true that because it is rectangular in shape, it has three axes but the long axis Z—Z that passes through the cap is the dominant axis. The holes 11 are arranged so that the demonstration model of this invention will rotate about this long axis Z—Z. Accordingly, the geometry of the device of this invention aids in grasping the principle being taught. The rectilinear container is a more felicitous expression of the purpose of the demonstration than the spherical container.

Furthermore, the holes 11 are arranged so that the demonstration model 5 of this invention will rotate about the long axis Z—Z. More importantly, this rectilinear design permits eliminating the radial arms of the traditional demonstration model. Thus the line of force acting on the container 6 is more readily seen as perpendicular to the broad surface and thus a moment about the axis Z—Z.

The device 5 as described very simply and clearly demonstrates the principle of operation of Hero's engine, that is, a steam reaction turbine while being of a low cost construction which is desirable for educational institutions. The device can be used any number of times in a single demonstration by simply adding cool water to lower the temperature of the heated water below the boiling point and reheating the water to evolve steam. In addition, the device has a substantially long life and because of its simplicity can be subjected to normal wear and tear without losing its effectiveness.

Having thus described an embodiment of the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An educational device for demonstrating the principle of a steam reaction turbine comprising a container enclosed on all sides and having first and second opposed elongated side walls, a lip at the upper edge of each of said side walls, a first hole in said first side wall and a second hole in said second side wall, said holes being laterally displaced in opposite directions from a transverse plane through the center of gravity of said container, and means abutting the underside of said lips for suspending said container from the top portion thereof, said means having an apex for providing a point of support supporting the device in depending fashion so that said container is free to rotate about an axis passing through said center of gravity parallel to said side walls.

2. An educational device for demonstrating the principle of a steam reaction turbine comprising a rectangularly shaped elongated container for containing fluid therein having a pair of opposed vertically disposed elongated broad sides and a pair of holes, each of said holes being formed transversely in an opposed side of said opposed broad sides in asymmetric relation to the other of said pair of holes for directing a flow of fluid out of said container transversely of and through said side walls, and a yoke means for gripping the top portion of said container, said yoke means having an apex for providing a point of support supporting the device in depending fashion so that said container is free to rotate about an axis passing through said center of gravity parallel to said broad sides.

3. An educational device for demonstrating the principle of a steam reaction turbine comprising a rectangularly shaped container for containing fluid therein having a pair of opposed broad sides, a lip at the upper edge of said sides and a pair of holes, each of said holes being formed in an opposed side of said opposed broad sides in asymmetric relation to the other of said pair of holes on opposite sides of an axis passing through the center of gravity of said container, a V-shaped yoke means having a plurality of oppositely inwardly disposed gripping fingers at the free ends thereof for gripping said broad sides of said container while abutting said lip, and a thread secured to said yoke means for supporting the device in depending fashion.

4. An educational device as set forth in claim 3 wherein said gripping fingers are spring biased towards each other when in gripping contact with said container.

5. An educational device for demonstrating the principle of a steam reaction turbine comprising a rectangularly shaped container for containing fluid therein having a pair of opposed broad sides, a circumferential lip at the upper edge of said sides and a pair of holes, each of said holes being formed in an opposed side of said opposed broad sides in asymmetric relation to the other of said pair of holes, a V-shaped yoke means having a plurality of oppositely inwardly disposed gripping fingers at the free ends thereof for gripping said broad sides of said container while abuting said lip and a pair of centrally disposed apertures at the apex thereof, and a thread passing through the apertures of said V-shaped yoke means for securement thereto whereby the device is adapted to be supported in depending fashion.

6. An educational device as set forth in claim 5 wherein said container has a cap means for removably sealing a filling port in the top surface thereof.

7. In combination with a heat source, an educational device for demonstrating the principle of a steam reactor turbine comprising a rectangularly shaped container for containing fluid therein having a pair of opposed broad sides a circumferential lip at the upper edge of said sides and a pair of holes, each of said holes being formed in an opposed side of said opposed broad sides in asymmetric relation to the other of said pair of holes, a V-shaped yoke means having a plurality of oppositely inwardly disposed gripping fingers at the free ends thereof for gripping said broad sides of said container while abutting said lip, and a pair of centrally disposed apertures at the apex thereof, and a thread passing through the apertures at said V-shaped yoke means for securement thereto in order to support said device in depending fashion over said heat source.

References Cited

UNITED STATES PATENTS

| | | | |
|---|---|---|---|
| 319,359 | 6/1885 | Gieson | 24—255 X |
| 358,675 | 3/1887 | Kenyon | 24—259 X |
| 967,628 | 8/1910 | Franklin | 24—259 |
| 1,196,833 | 9/1916 | Zimmerman | 294—33 |
| 1,282,212 | 10/1918 | Fulton | 46—55 |
| 1,763,965 | 6/1930 | High | 294—27 |
| 2,449,405 | 9/1948 | Mordan | 46—67 |
| 2,560,833 | 7/1951 | Wagner | 46—41 |

OTHER REFERENCES

Catalog for School Teaching Aids and Supplies, Models of Industry, Inc., Berkeley, Calif., "STAS Instructional Materials for Elementary and Jr. High Science-Mathematics," 1964 p. 26.

EUGENE R. CAPOZIO, *Primary Examiner.*

H. S. SKOGQUIST, *Assistant Examiner.*